US012242569B1

(12) United States Patent
Severtson et al.

(10) Patent No.: US 12,242,569 B1
(45) Date of Patent: Mar. 4, 2025

(54) METHOD AND SYSTEM FOR PROCESS IDENTIFICATION USING DATA MINING

(71) Applicant: STATE FARM MUTUAL AUTOMOBILE INSURANCE COMPANY, Bloomington, IL (US)

(72) Inventors: Forrestt Severtson, Alpharetta, GA (US); Darren Lim, Champaign, IL (US); Julian Francisco Nieto, Edwardsville, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 742 days.

(21) Appl. No.: 16/688,106

(22) Filed: Nov. 19, 2019

(51) Int. Cl.
*G06F 18/00* (2023.01)
*G06F 9/54* (2006.01)
*G06F 16/28* (2019.01)
*G06F 18/214* (2023.01)
*G06F 18/23* (2023.01)
*G06F 40/126* (2020.01)
*G06Q 10/10* (2023.01)

(52) U.S. Cl.
CPC .......... *G06F 18/2155* (2023.01); *G06F 9/542* (2013.01); *G06F 16/285* (2019.01); *G06F 18/23* (2023.01); *G06F 40/126* (2020.01); *G06Q 10/10* (2013.01)

(58) Field of Classification Search
None
See application file for complete search history.

(56) References Cited

U.S. PATENT DOCUMENTS

| | | | | |
|---|---|---|---|---|
| 7,499,046 B1 * | 3/2009 | Wright | .................. | G06F 16/447 345/418 |
| 10,223,751 B1 * | 3/2019 | Hutchinson | ............ | G06Q 40/08 |
| 10,444,941 B2 * | 10/2019 | Cervelli | .................. | G06T 11/60 |
| 10,885,058 B2 * | 1/2021 | Andritsos | ............ | G06F 16/2465 |
| 11,170,177 B2 * | 11/2021 | Dowell | .................. | G06F 40/35 |
| 11,250,064 B2 * | 2/2022 | Frenkel | ................. | G06F 16/906 |

(Continued)

OTHER PUBLICATIONS

GitHub, Inc., BPMN support for PM4Py, downloaded from the Internet at: <https://github.com/pm4py/pm4py-bpmn> (Jun. 2019).

(Continued)

*Primary Examiner* — Farhan M Syed
(74) *Attorney, Agent, or Firm* — MARSHALL, GERSTEIN & BORUN LLP

(57) ABSTRACT

A method for identifying a process includes storing formatted data, generating aggregated traces by preprocessing the formatted data, encoding each of the aggregated traces using a respective atomic word, generating a subset of aggregated traces by compressing the aggregated traces, clustering the subset of aggregated traces, and labeling the clusters. A system includes a processor and a memory including instructions that when executed cause the system to store formatted data, generate traces, encode the traces to an atomic word, generate a subset traces, cluster the subset traces, and label the clusters. A non-transitory computer readable medium containing program instructions that when executed, cause a computer system to store formatted data, generate traces, encode the traces to an atomic word, generate a subset traces, cluster the subset traces, and label the clusters.

18 Claims, 5 Drawing Sheets

(56) References Cited

U.S. PATENT DOCUMENTS

| | | | | |
|---|---|---|---|---|
| 2005/0033777 | A1* | 2/2005 | Moraes | G06F 16/275 |
| 2007/0132767 | A1* | 6/2007 | Wright | G06V 20/52 |
| | | | | 345/475 |
| 2007/0171716 | A1* | 7/2007 | Wright | G06T 11/206 |
| | | | | 365/185.12 |
| 2019/0114716 | A1* | 4/2019 | Gulati | G06F 16/29 |
| 2019/0138597 | A1* | 5/2019 | Dowell | H04L 65/40 |
| 2019/0377818 | A1* | 12/2019 | Andritsos | G06F 16/2465 |
| 2020/0019571 | A1* | 1/2020 | Frenkel | G06F 16/906 |
| 2020/0206920 | A1* | 7/2020 | Ma | G06Q 10/0633 |
| 2021/0004386 | A1* | 1/2021 | Andritsos | G06F 16/26 |
| 2022/0171815 | A1* | 6/2022 | Frenkel | G06F 16/906 |

OTHER PUBLICATIONS

International Conference on Process Mining (ICPM), Process Mining Conference Series, https://icpmconference.org/ (2019, 2020).

Process Mining Group, Math&CS department, Eindhoven University of Technology, downloaded from the Internet at: <http://www.processmining.org/> (2016).

Process Mining Manifesto, IEEE CIS Task Force on Process Mining, 15 pages (2012).

Process Mining: Data Science in Action, downloaded from the Internet at: <https://www.coursera.org/learn/process-mining> (Jul. 2017).

Website for bupaR, Janssenswillen, G., Depaire, B., Swennen, M., Jans, M., & Vanhoof, K. (2019). bupaR: Enabling reproducible business process analysis. Knowledge-Based Systems, 163, 927-930.

Website for Celonis, downloaded from the Internet at: <https://www.celonis.com/> (Jul. 2016).

* cited by examiner

METHOD AND SYSTEM FOR PROCESS IDENTIFICATION USING DATA MINING

FIELD OF THE DISCLOSURE

The present disclosure generally relates to a system and method of process identification using data mining, and more particularly to methods and systems for capturing and analyzing event data to identify similar events and for analyzing the similar events to identify latent processes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Process mining is a new discipline in the fields of data science and big data. A goal of process mining is to understand complex sequences of events. For example, a hospital may seek to analyze events related to patient care to quantify patient treatment and to improve patient outcomes. Traditionally, process mining includes capturing event content in a storage medium. The event content may correspond to events which occur in an organization (e.g., a patient was moved from an intensive care unit to another unit). Event content is conventionally stored in textual form (e.g., a patient chart, an electronic health care record, a digital file, etc.) and may include structured or unstructured data.

BRIEF SUMMARY

In one aspect, a method of identifying a process includes storing formatted data from a data collection device in an electronic database, generating aggregated event traces by preprocessing the formatted data, encoding each of the aggregated event traces, wherein each unique event in the aggregated event traces is represented using a respective atomic word, generating a subset of aggregated event traces by compressing the aggregated event traces, clustering each of the subset of aggregated event traces into a respective cluster, and labeling each of the plurality of clusters by analyzing the subset of corresponding aggregated event traces.

In another aspect, a computing system for identifying processes includes one or more processors and a memory including computer executable instructions. The computer executable instructions, when executed by the one or more processors, cause the computing system to store formatted data from a data collection device in an electronic database, generate aggregated event traces by preprocessing the formatted data, encode each of the aggregated event traces, wherein each unique event in the aggregated event traces is represented using a respective atomic word, generate a subset of aggregated event traces by compressing the aggregated event traces, cluster each of the subset of aggregated event traces into a respective cluster, and label each of the plurality of clusters by analyzing the subset of corresponding aggregated event traces.

In yet another aspect a non-transitory computer readable medium containing program instructions that when executed, cause a computer system to store formatted data from a data collection device in an electronic database, generate aggregated event traces by preprocessing the formatted data, encode each of the aggregated event traces, wherein each unique event in the aggregated event traces is represented using a respective atomic word, generate a subset of aggregated event traces by compressing the aggregated event traces, cluster each of the subset of aggregated event traces into a respective cluster, and label each of the plurality of clusters by analyzing the subset of corresponding aggregated event traces.

DETAILED DESCRIPTION

Overview

The present techniques include methods and systems for process identification using data mining techniques, and more particularly, for capturing and analyzing event data to identify processes. In an embodiment, the present techniques include capturing event data in a claims handling system. The event data may be generated by the claims handling system in response to input provided by users of the claims handling system (e.g., an employee or a customer). The claims handling system may store the event data in a storage medium. In some embodiments, the event data is line-oriented or row-oriented. The event data may be represented chronologically.

An event data processing system may analyze the event data to identify similar events. The analysis to identify similar events may include preprocessing, statistical analysis, unsupervised machine learning (e.g., clustering), etc. Once similar events are identified, the present techniques may analyze the similar events to generate process maps.

Example Computing Environment

Figure 1:
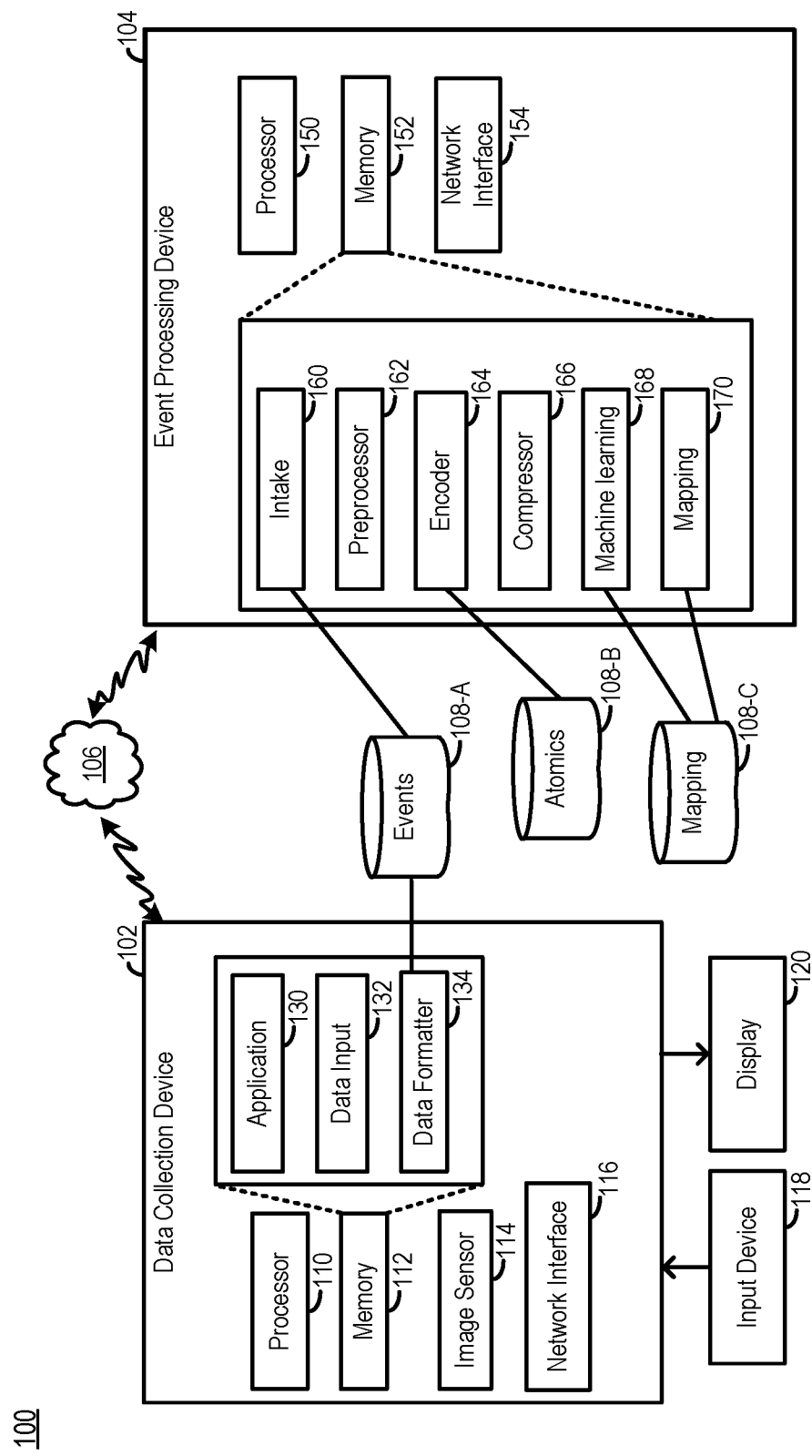
FIG. 1 depicts an example computing environment for implementing an event processing method and system for implementing event clustering and process identification, according to an embodiment.

FIG. 1 depicts an example computing environment 100 for implementing an event processing method and system for implementing, inter alia, event clustering and process identification. The environment 100 may include an event data collection device 102, an event processing device 104, a network 106, an events database 108-A, an atomics database 180-B and a mapping database 108-C. Generally, the event data collection device 102 generates events that are stored as event data in the event database 108-A and processed by the event processing device 104.

The event data collection device 102, the event processing device 104, and the events database 108-A are communicatively coupled via the network 106. In some embodiments, the event data collection device 102 may be remote from the event processing device 104. The network 106 may include any suitable combination of wired and/or wireless communication networks, such as one or more local area networks (LANs), metropolitan area networks (MANs), and/or wide area network (WANs). As just one specific example, the network 106 may include a cellular network, the Internet, and a server-side LAN. As another example, the network 106 may support a cellular (e.g., 4G, 5G, etc.) connection to a mobile computing device of a user and an IEEE 802.11 connection to the mobile computing device. Each of the databases 108-A-108-C may comprise any suitable database (e.g., a structured query language (SQL) database, a flat file database, a key/value data store, a relational database management system (RDBMS), etc.), a plurality of database tables for storing data according to data storage schema, relational linkages between tables, and complex data types such as time series data. The event processing device 104 may, in some implementations, include multiple servers and/or other computing devices. Moreover, the event processing device 104 may include multiple servers and/or other computing devices distributed over a large geographic area (e.g., including devices at one or more data centers), and any of the operations, computations, etc., described below may be performed in by remote computing devices in a distributed manner.

The event data collection device may include a processor 110, a memory 112, an image sensor 114, a network interface 116, an input device 118 and a display 120. The processor 110 may be a single processor (e.g., a central processing unit (CPU)), or may include a set of processors (e.g., a CPU and a graphics processing unit (GPU)). The computing environment 100 may include one or more instances of the event data collection device 102. In some cases, a first instance of the event data collection device 102 may be configured as a server or a desktop-configured instance, whereas a second instance is configured as a mobile computing device instance. The one or more instances of the event data collection device 102 may generate events that are stored in the events database 108-A.

The memory 112 may be a computer-readable, non-transitory storage unit or device, or collection of units/devices, that includes persistent (e.g., hard disk) and/or non-persistent memory components. The memory 112 may store instructions that are executable on the processor 110 to perform various operations, including the instructions of various software applications and data generated and/or used by such applications. For example, the memory 112 may include one or more memory modules, such as an application module 130, a data input module 132 and a data formatter module 134. In the example implementation of FIG. 1, the memory 112 stores instructions that when executed by the processor 110 facilitate the collection of input data and the generation of event data.

The image sensor 114 may include one or more sensors, such as a camera, a video camera, and/or a microphone. For example, the image sensor 114 may be included in a mobile computing device that is an instance of the event data collection device 102. In that case, a user may use the event data collection device 102 to collect information (e.g., photographs of a damaged vehicle relating to an insurance claim) while in the field.

The network interface 116 includes hardware, firmware and/or software configured to enable the data collection device 102 to exchange electronic data with other devices on the network 106 (e.g., the event processing device 104), and to access other networked resources, such as the events database 108-A For example, network interface 116 may include a cellular communication transceiver, a Wifi transceiver, and/or transceivers for one or more other wireless communication technologies (e.g., 4 g).

The input device 118 includes hardware, firmware and/or software configured to enable a user to interact with (i.e., both provide inputs to) the event data collection device 102. For example, the input device 118 may be a computer keyboard. More than one input device 118 may be attached to the event data collection device 102.

The display 120 includes hardware, firmware and/or software configured to enable a user to interact with (i.e., perceive outputs of) the event data collection device 102. For example, the display 120 may be a computer monitor. In some embodiments, the input device 118 and the display 120 may be combined. For example, the display 120 may include a capacitive touchscreen with both display and manual input capabilities. Alternatively, or in addition, the display 120 may include a keyboard for accepting user inputs, and/or a microphone (with associated processing components) that provides voice control/input capabilities to the user.

The application module 130 may correspond to a computer application executing in the memory 112 of the event data collection device 102. For example, the application module 130 may correspond to a computer application such as an enterprise claims system (ECS) that allows the collection of data used to report, process, pay and/or manage insurance claims. The application module 130 may collect information from a user, such as a claims handler, a claims adjuster, a customer, a field investigator, etc. The information collected may include suitable information for claims processing, such as property information/attributes (e.g., vehicle identification, a home description, etc.), an insured profile (e.g., name, address, telephone, etc.), billing information, a witness statement, a photograph or video, a first notice of loss, an accident description, a medical bill, an interview, an electronic health record, etc. The collected data may be input into as raw data into one or more user interface of the computer application, and the application 130 may use the data input module 132 to collect/process the raw data.

The data input module 132 may include instructions for storing the raw data in an electronic database (e.g., the events database 108-A). In addition, or alternatively, the data input module 132 may pass the raw data to another module (e.g., the data formatter module 134). The data formatter module 134 may transform the raw data into formatted data. The formatted data may be encoded in a common structured data format (e.g., XML, JSON, CSV, etc.), as plain text, in a proprietary data format, etc. The formatted data may include many (e.g., 30 or more) columns of data, and each row may contain multiple records that may be recursive (e.g., a nested or hierarchical data set). Columns that may be included in the formatted data include a claim identifier (id) and a list of timestamped electronic entries corresponding to events in an activity (e.g., chronological electronic entries corresponding to actions taken with respect to an insurance claim).

The data formatter module 134 includes instructions for causing the formatted data to be stored in an electronic database (e.g., the events database 108-A). As noted above, the raw data may correspond to data collected when an insured files an insurance claim. In such an example, the raw data may include, and the data formatter 134 may store, data related directly to the claim in addition to metadata. Metadata may include information (e.g., variables, milestones, agent aliases, labels, etc.) Attendant to the operation of the application 130 and/or the information collected/processed by the data input module 132. The raw data may be accessed by other computing resources, such as the event processing device 104.

The event processing device 104 includes a processor 150 and a memory 152. The processor 150 may be a single processor (e.g., a central processing unit (CPU)), or may include a set of processors (e.g., a CPU and a graphics processing unit (GPU)). The memory 152 is a computer-readable, non-transitory storage unit or device, or collection of such units/devices, that may include persistent (e.g., hard disk) and/or non-persistent memory components. The memory 152 includes an intake module 160, a preprocessor module 162, an encoder module 164, a compressor module 166, a machine learning module 168 and a mapping module 170. More or fewer modules may be included in the memory 152, in some embodiments and scenarios. Each of the modules included in the memory 152 may access the electronic databases 108-A-108-C.

The event processing device 104 further includes a network interface 154 which includes hardware, firmware and/or software configured to enable the event processing device 104 to exchange electronic data with other devices on the network 106 (e.g., the data collection device 102) and to access other networked resources, such as the events database 108-A. For example, network interface 154 may include a cellular communication transceiver, a Wifi transceiver, and/or transceivers for one or more other wireless communication technologies (e.g., 4 g).

The intake module 160 is generally configured to retrieve/receive formatted data records from an electronic database (e.g., the events database 108-A). For example, a record may be a data structure corresponding to one row of data in a table of a relational database. The record may include one or more fields, corresponding to the columns of the formatted data. The intake module 160 may receive/retrieve a subset of the formatted data. For example, the intake module 160 may receive/retrieve the claim id, a list of actions wherein each action includes a respective timestamp. The intake module 160 may pass the subset of formatted data to the preprocessor module 162.

The preprocessor module 162 is generally configured to generate aggregated event traces, in some cases using data compression techniques, by transforming the formatted data into aggregated traces. An aggregated event trace (T) is a data structure that includes multiple rows of formatted data. For example, an aggregated event trace may be an aggregation of insurance claim records by claim id, wherein the aggregated event trace includes the claim id, and a time series of one or more events. Multiple aggregated event traces may be combined into a single data set $T_0$-$T_n$. Event traces may contain a key (e.g., claim ID) and one or more primitive and/or complex data types (e.g., lists, strings, time series, etc.).

For example, the aggregated event trace $T_0$ may contain {claim_id=xyz123, event$_1$, timestamp$_1$, . . . event$_m$, timestamp$_m$}. Other modules (e.g., the encoder module 164) may analyze the aggregated event traces. In some cases the preprocessor module 162 may create an aggregated event trace by querying the events database 108-A for all claim records corresponding to a particular claim ID (e.g., via a WHERE clause of a relational database). A claim record may be an event related to, or occurring during, the processing of an insurance claim, such as "passenger information entered," "first notice of loss," "passenger information entered," etc. A claim record may be associated with metadata. For example, in the "passenger information entered" event, the passenger information may be associated with the event (e.g., passenger first name, passenger last name, passenger address, passenger age, etc.). The data formatter 134 may store any suitable metadata associated with a claim event in the events database 108-A.

The encoder 164 may encode the events in the time series of one or more events. For example, the encoder 164 may encode each event using an atomic word. The atomic word may be one of a dictionary of atomic words stored in the atomics database 108-B. The atomic word may be a string of one or more characters (e.g., an emoji, a Unicode character, a word, a phrase, etc.). The atomic words in the atomics database 108-B may be a predetermined list of word to atomic word mappings (e.g., the word "claim" may be mapped to an Umbrella emoji). The encoder 164 may include normalization capabilities, such that all similar or related words and phrases (e.g., "claim," "claims," "claiming," "filed a claim," etc.) are mapped to the same atomic word. Any suitable algorithm or statistical method may be used to normalize an event, such as a Bayesian inference algorithm, a machine learning technique, etc.

The encoder 164 may replace the events in the time series of one or more events with encoded event equivalents. For example, the aggregated event trace $T_0$ may be transformed to {claim_id=xyz123, encodedEvent$_1$, timestamp$_1$, . . . encodedEvent$_m$, timestamp$_m$} wherein each encodedEvent is the atomic word equivalent of the original event. In an embodiment, the trace may be copied instead of event values being replaced in situ.

In a preferred embodiment, the encoder 164 encodes each event, thereby providing several benefits. First, an event represented as a single character (e.g., a Unicode character) allows much more data to be shown to a user via a display such as the display 120 given a fixed screen/pixel size. Second, a Unicode encoding such as utf-8 includes many (e.g., over one million) individual code points, each of which can be used to represent a unique word. Whereas the English language is limited to only 26 non-accented characters, Unicode allows for a much greater range of unique graphical information to be depicted. In practice, many atomic evens (e.g., 300 or more) unique events require representation. Third, words encoded in Unicode or as emojis allow for compact visualizations using memorable characters, including characters in color, to be depicted. For example, some users may find a yellow banana or a purple elephant to be a more memorable/striking graphical representation than a mere black and white letter display.

Fourth, by encoding events into single atomic words, a trained user can read a string of encoded events and form an immediate impression of what occurred in the series of events by reading a single line of text, without having to peruse multiple lines, paragraphs or even pages of text. Events may be normalized, so that the user does not need to interpret multiple expressions corresponding to the same event. Fifth, the encoding techniques used in the present techniques improve the functioning of the event processing device 104. By compressing events, the encoder 164 reduces the amount of computer storage and networking resources required to store and/or transmit event data. For example, the preprocessor 162 has reduced the amount of event data by over 95%, in one practical scenario.

Sixth, converting a trace to a sequence of characters (e.g., a string) allows the traces to be analyzed using existing string processing methods, such as string processing algorithms, formal language analysis (e.g., automata theory), combinatorics of words, and analytics used in genetics research. Example of atomic word encoding are discussed in further detail below. The time series of one or more events and the encoded events may be analyzed by other modules of the event processing device 104 (e.g., the compressor 166 and/or the machine learning module 168).

The compressor 166 may include computer-readable instructions for compressing an encoded event trace. The compressor 166 may perform one or more statistical analyses on the encoded event trace. Specifically, the compressor 166 may compute a probability of a particular event being observed as a function of time in a window. In some embodiments, the compressor 166 may compute the probability of an event occurring in a trace by counting the number of occurrences of the event in all traces. The compressor 166 may compute the length of each trace (e.g., the number of timestamped events in the trace). The compressor 166 may compute the distribution of length of traces. The statistical analyses may take into account one or both of (i) the sequence of events, and (ii) time stamps. The compressor 166 may include computer-executable instructions for compressing the traces using the information computed during the statistical analyses without losing appreciable statistical information. In some embodiments, dimensionality reduction, feature selection and/or representation learning may be used to remove noise (e.g., irrelevant/redundant features).

For example, the compressor 166 may select a compressed distribution of events using a distribution (e.g., a normal, lognormal, beta, custom distribution, etc.). The compressor 166 may select events according to alternative/additional criteria (e.g., trace time of day, trace probability, likelihood, etc.) in some embodiments. In practice, the compressor 160 reduces the sum of unique events from a large number (e.g., over 300) to a number (e.g., 40 or fewer). The compressor 166 beneficially improves the performance of the event processing device 104, by requiring less storage space and less network bandwidth. The compressor 166 also facilitates user review by reducing the amount of information that the user has to recall in order to use the system. For example, a user will find recalling 40 unique Emojis much easier than recalling 300 of the same. Because the compressor 166 retains statistically relevant information, the accuracy of the system is preserved at the same time the amount of data analyzed is significantly reduced. After the compressor 166 compresses the traces, a machine learning module 168 is used to identify clusters of traces. However, it should be appreciated that in some embodiments, the compressor 166 may not be used.

The machine learning module 168 may analyze the data set of event traces having events encoded by the encoder 164 and/or compressed by the compressor 166. The machine learning module 168 may use supervised learning, unsupervised learning, self-supervised learning, and/or reinforcement learning. In a preferred embodiment, the machine learning module 168 uses unsupervised learning to identify clusters of similar event traces. The clusters of similar event traces may indicate correlations present in the aggregated event trace data structure. Generally, clustering algorithms group items according to the similarity of the items to one another, wherein similarity is determined according to a similarity metric. Many clustering algorithms and similarity metrics are suitable for performing the present techniques. For example, a Euclidean distance on bag of words metric (e.g., including a w-shingling routine) may be used to generate representations that convert strings to a probability density function over a vector space corresponding to the number of unique events. In an embodiment, a Euclidean distance metric of probability density function over all possible n-grams may be used. In yet another embodiment, a Jaccard distance function metric may be computed on the sets of characters in respective traces. Once the metric is established, the machine learning module 168 may apply a clustering technique.

Those of skill in the art will readily appreciate that many clustering techniques exist. For example, the present techniques may use a density-based spatial clustering of applications with noise algorithm (DBSCAN). The present techniques may use an agglomerative clustering algorithm, or another hierarchical clustering algorithm. A K-means or T-distributed stochastic neighbor embedding algorithm (tSNE) may be used, in some embodiments. Multidimensional scaling and/or latent Dirichlet allocation (LDA) techniques may be applied in some embodiments. A goal of the clustering technique is to find clusters that are representative of common structures within the domain of analysis. For example, in the case wherein the present techniques are used to analyze insurance claims handling processes, identifying a clustering of insurance claims that share a common characteristic of taking a long time to process, or having multiple redundant steps, may be desirable. Once the machine learning module 168 has analyzed the data set of event traces and assigned each trace to a cluster, the mapping module 170 may analyze the clusters to characterize them.

The mapping module 170 includes computer-executable instructions for analyzing the clusters identified by the machine learning module 168. The mapping module 170 may include instructions for characterizing each cluster. For example, the mapping module 170 may be configured to analyze each trace within a cluster (e.g., each claim within a cluster) to determine high frequency terms within each trace that represent the cluster as a whole. The mapping module 170 may compare distributions of event attributes across clusters to find similar clusters. For example, if each event in a cluster includes a vehicular accident, then the mapping module 170 may characterize the cluster as "Vehicle accident." As between two clusters each including vehicle accidents, the mapping module 170 may label the first "Fender bender" and the second "Pile up" based on the number of vehicles involved. In some embodiments, the mapping module 170 may include instructions for accessing external information used to characterize the clusters. For example, the mapping module 170 may include instructions for clustering claims according to an attribute of interest (e.g., claim processing time, claim payout amount, etc.). The mapping module 170 may flag claims for follow-up to help speed up and make the claims handling process more efficient. The mapping module 170 may include instructions for displaying traces, including converting atomic words to their full textual equivalents. The mapping module 170 may also generate a map of events, wherein each event is displayed graphically in a linear (e.g., chronological) order.

The computer-implemented methods discussed herein may include additional, fewer, or alternate actions, including those discussed elsewhere herein. The methods may be implemented via one or more local or remote processors, transceivers, servers, and/or sensors (such as processors, transceivers, servers, and/or sensors installed in mobile devices, or associated with smart infrastructure or remote servers), and/or via computer-executable instructions stored on non-transitory computer-readable media or medium.

In operation, an employee of a company (e.g., a claims handler of an insurer) accesses the data collection device 102. The employee may use a mobile computing device (e.g., a smart phone, a tablet, a laptop, etc.) to access the data collection device 102 remotely, or a direct input device such as the input device 118. The user may enter claim information (e.g., an incident date/time, automobile information, passenger information, etc.) into the application 130. In some cases, a user (e.g., an insured of the insurer) accesses the application 130 of the data collection device 102 directly without the involvement of the employee. Once the claim information is entered, the data input module 132 may process and/or store the claim information. The data formatter 134 may encode the data into a structure data format and store the formatted data in an electronic database such as the events database 108-A.

The event processing device 104 may execute in parallel to the data collection device 102. The techniques provided by the event processing device 104 may be executed periodically according to a schedule (e.g., once per hour or more frequently). In some embodiments, a user may initiate the event processing device 104 operations by executing a remote command (e.g., via a web page, a mobile application, etc.). The event processing device 104 may include an incremental mode, wherein the intake module 160 of the event processing device 104 may periodically or continuously poll for new event data in the events database 108-A. When the data collection device 102 stores a new record in the events database 108-A, the intake module 160 may immediately retrieve and begin processing the record.

The preprocessor 162 may generate aggregated event traces, as discussed above. The aggregated event traces may be passed from the preprocessor to the encoder 164 and/or stored in a database (e.g., the events database 180-A). The encoder may convert textual event descriptions to atomic words, as discussed above. The atomic words may be retrieved from the atomics database 180-B. When a word does not exist, the encoder 164 may prompt a user to input or to choose an atomic word. For example, if a given word does not exist in the atomics database 108-B, then the user may be prompted to select an atomic word. The encoder 164 may normalize the descriptions prior to atomic word mapping. Once the aggregated event traces are encoded, the compressor 166 may compress the event traces to keep only those that are statistically significant, and the machine learning module 168 may analyze the event traces using one or more unsupervised learning (e.g., clustering) techniques. The machine learning module 168 may store the result of the clustering in the mapping database 108-C.

In some embodiments, the result of the machine learning analysis may be used by a visualization module (not depicted) to generate a visualization (e.g., a chart and/or graph). The event processing device 104 may include a means for displaying the visualization to a user, and/or for transmitting the visualization as a report (e.g., via HTML, an email, etc.) to the user, wherein the user is able to analyze the visualization to interactively explore clusters of aggregated traces. In other embodiments, as discussed above, the results of the machine learning module 168 are processed further by the mapping module 170 to generate characterizations of the traces. The mapping module 170 may generate reports including the characterizations and cluster information (e.g., metadata) and/or store the characterizations and cluster information in the mapping database 108-C. The mapping module may analyze each cluster using statistical methods to generate a process map.

Exemplary Event Encoding

Figure 2:
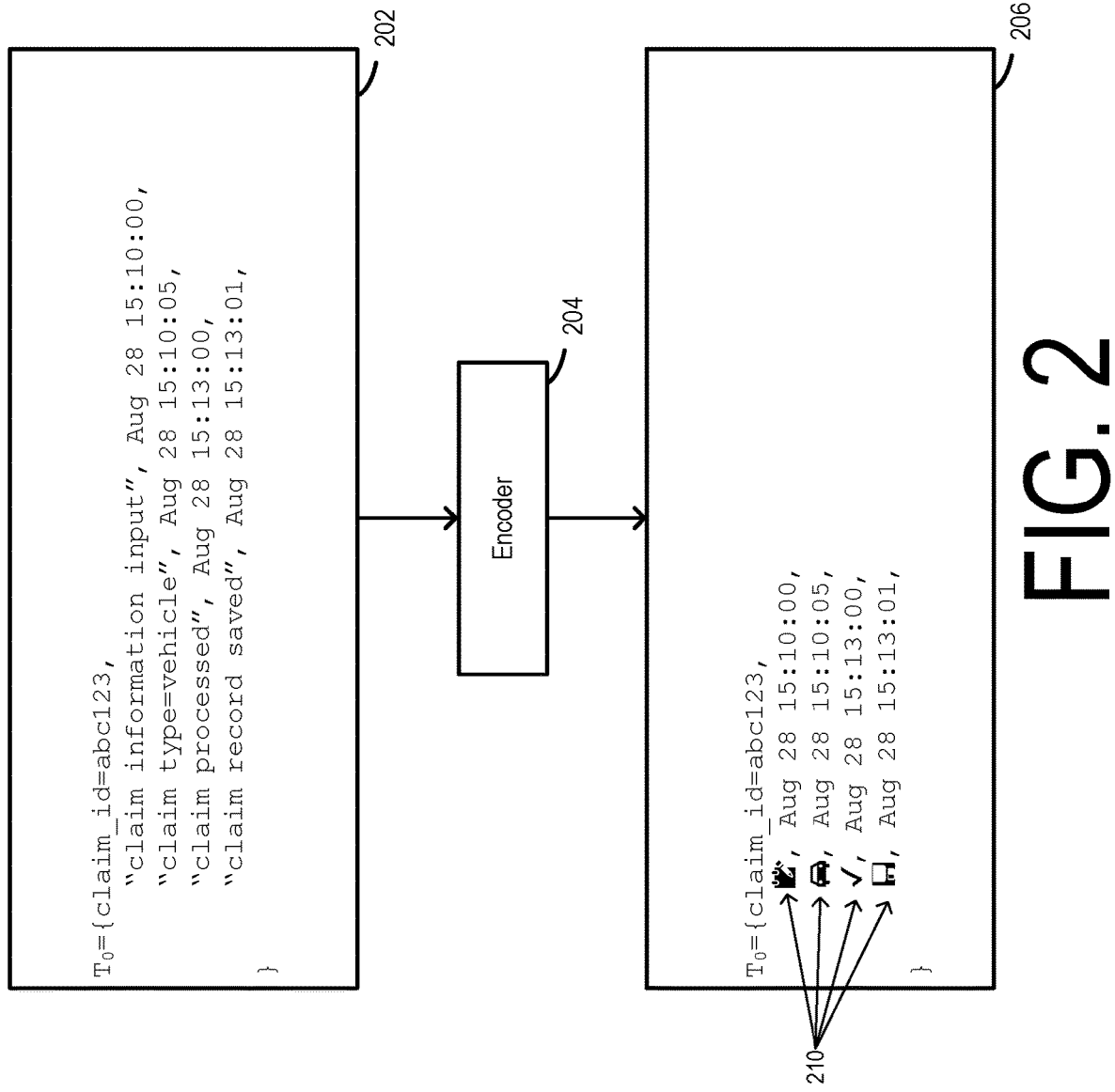
FIG. 2 depicts an exemplary encoding of an original aggregated event trace into an encoded aggregated event trace via an encoder, according to an embodiment.

FIG. 2 depicts an exemplary encoding 200 of an original aggregated event trace 202 into an encoded aggregated event trace 206 via an encoder 204, according to an embodiment. The original aggregated event trace 200 includes a claim ID and three timestamped event types, corresponding to the format given above: {claim_id=xyz123, $event_1$, $timestamp_1$, . . . $event_m$, $timestamp_m$}. Of course, those of skill in the art will appreciate that the format of the aggregated event trace may differ, in some embodiments. For example, the aggregated event trace may be represented as a nested list. The encoder 204 may correspond to the encoder module 164 of FIG. 1. The encoded aggregated event trace 206 includes events that are encoded into atomic words 210. The atomic words (e.g.,  , √, ) are graphical representations of the events included in the original aggregated event trace 202. Whereas the events would be confusing and difficult to analyze if presented to a user in textual form, the Unicode characters in the embodiment depicted by FIG. 4 allow the user to visually analyze the series of events very quickly, on a single line without the need to interpret the information. An insurance company may process many claims per day (e.g., 30,000 or more) and so the ability of users to quickly and efficiently analyze claims data in digital formats by focusing on the most important aspects of a claim is critical to the functioning of claims processing. A series of the encoded aggregated event traces 206 may be grouped together, as in FIG. 4.

Figure 3:
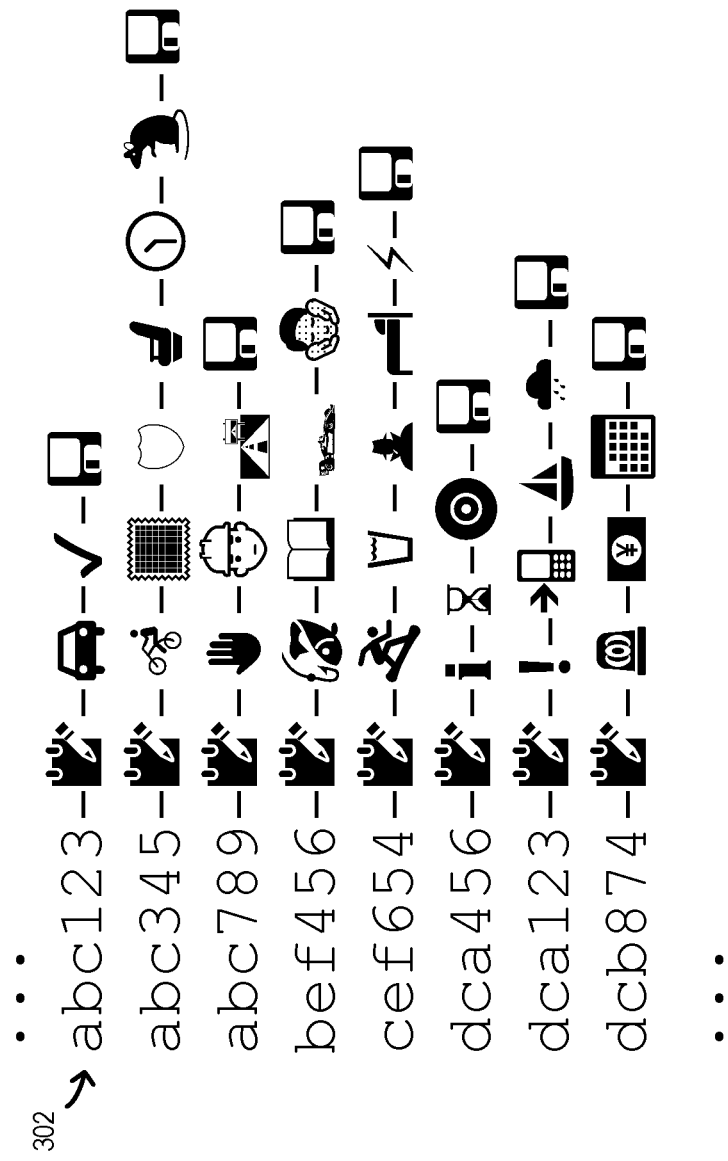
FIG. 3 depicts exemplary multiple aggregated event traces, including an aggregated encoded event trace, according to an embodiment.

FIG. 3 depicts exemplary multiple aggregated event traces 300, including an aggregated encoded event trace 302 that may correspond to the aggregated encoded event trace 206 of FIG. 2. The multiple aggregated event traces 300 may be displayed to a user in a graphical user interface (e.g., via a display device of the event processing device 104). Because each of the exemplary multiple aggregated event traces 300 is an insurance claim, each begins with an atomic word indicating claim information input and each ends with an atomic word indicating that the claim record was saved. It should be appreciated that the depicted event traces are simplified for expository purposes, and that many more events may be included, as well as many more event traces. The multiple aggregated event traces 300 may be produced by generated by the encoder 164 of FIG. 1. As noted above, the multiple aggregated event traces 300 may be compressed by the compressor 166 and analyzed by the machine learning module 168, to generate one or more clusters. In the depicted example, the first atomic word is the same (e.g., corresponding to a claim information input event). However, the example of FIG. 3 is simplified for purposes of explanation, and the first character may differ. For example, the first atomic word may correspond to an import event, a transfer event, etc. Similarly, in some embodiments, the event traces may be represented by a non-linear data structure (e.g., a hierarchical list).

Exemplary Clustering and Process Mapping

Figure 4:
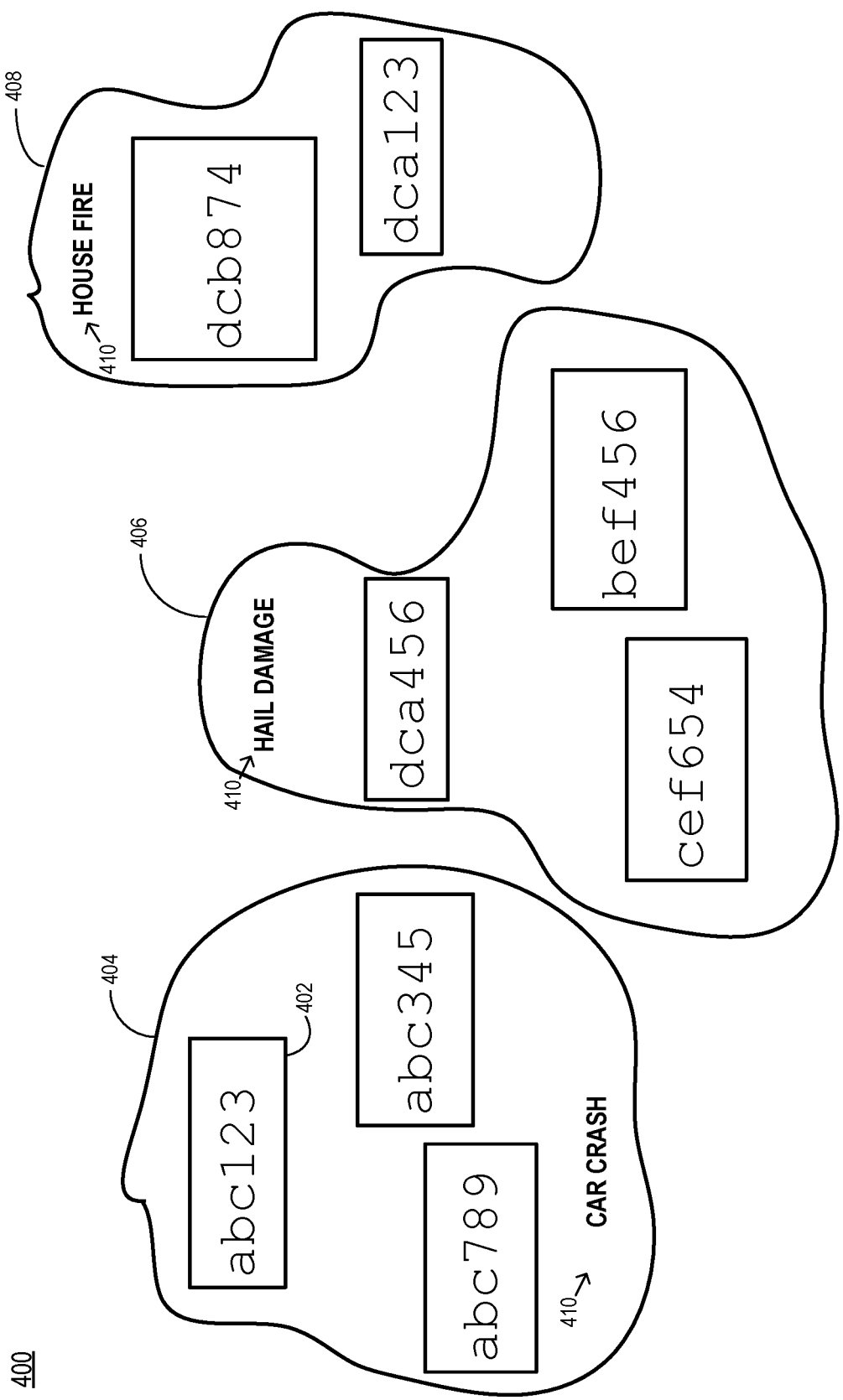
FIG. 4 depicts an example of one or more characterized clusters of aggregated event traces, according to an embodiment.

FIG. 4 depicts an example of one or more characterized clusters 400 of aggregated event traces. The event traces may correspond to the multiple aggregated event traces of FIG. 3. For example, cluster 404 includes event trace 402, which corresponds to the encoded event trace 302 of claim 3, along with two other event traces (e.g., insurance claims). A second cluster 406 and a third cluster 408 include the five remaining event traces depicted in FIG. 3. It should be appreciated that more or fewer clusters may be included, in some embodiments. The characterized clusters 400 of FIG. 4 represent the similarity of claims to one another. For example, the clustering algorithm employed by the machine learning module 168 determined that the event traces (i.e., claims) in the 404 cluster are all similar, that the event traces in the 406 cluster are similar, and that the event traces in the 408 cluster are similar. Therefore, as noted above, a visualization module may display the clusters 400 to a user, and the user could immediately determine that the claims within clusters are self-similar. Moreover, the characterized clusters 400 also include cluster characterizations 410. The cluster characterizations are based on commonalities within the events of the respective claims in each of the clusters 400. Of course, more granular characterizations are possible (e.g., multiple clusters may differentiate multiple car accident claims based on severity).

Figure 5:
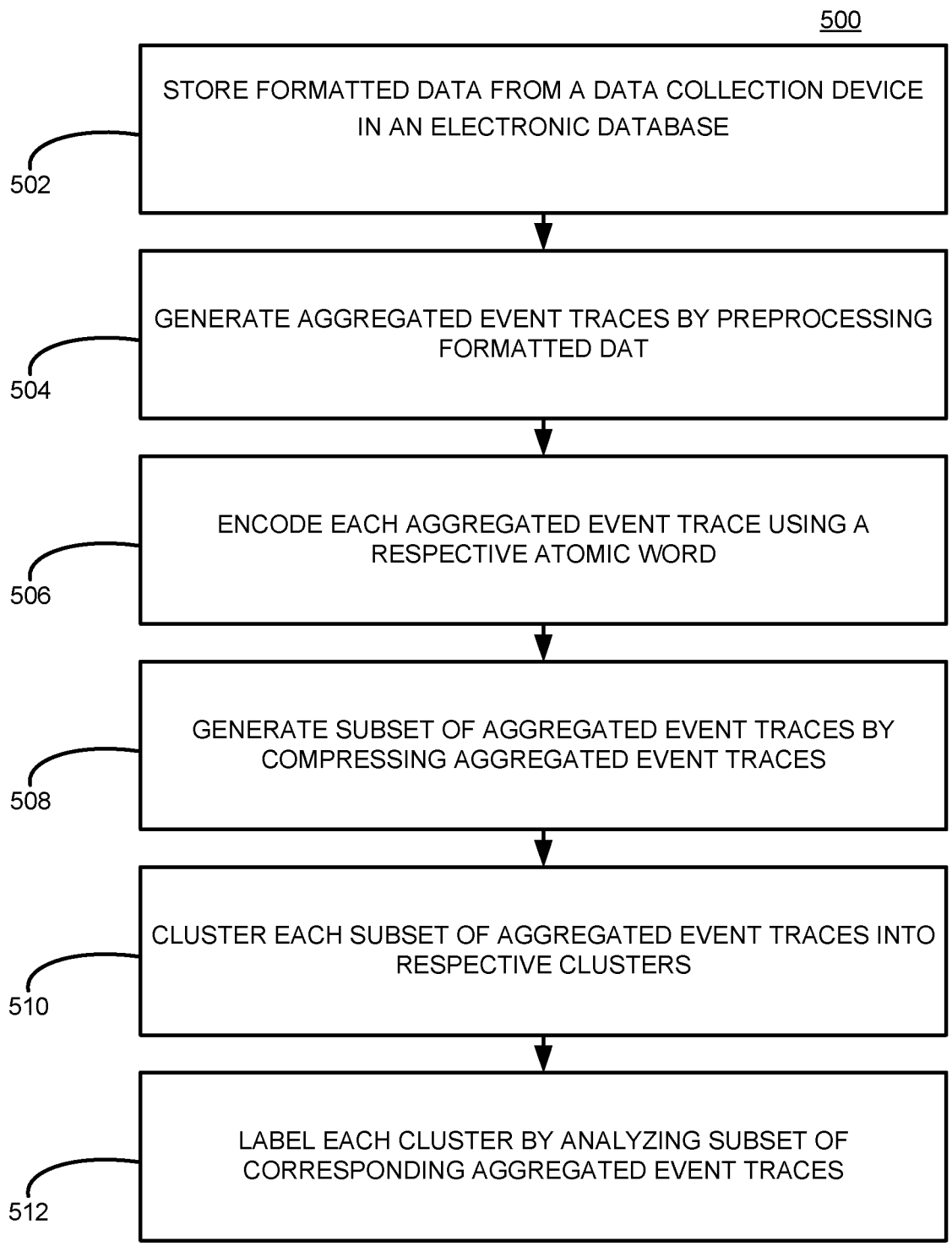
FIG. 5 depicts an example method for identifying a process, according to one embodiment and scenario.

FIG. 5 depicts an exemplary method 500 for identifying a process. The method 500 may include storing formatted data from a data collection device in an electronic database (block 502). As discussed with respect to FIG. 1, the data collection device may be a system for collecting claims data, such as an ECS, executing in the memory of the data collection device 102. Many users may access the data collection device at one time to input information, and the formatted data may be stored periodically, as the user inputs data, or when the user performs an action (e.g., when the user submits an electronic form).

The method 500 may include generating aggregated event traces by preprocessing the formatted data (block 504). Preprocessing generally includes converting line-oriented text data (e.g., XML, JSON, CSV, etc.) to a data object that includes a key (e.g., a claim ID) and a list of values (e.g., a list of Event-Timestamp tuples). As discussed with respect to FIG. 1, FIG. 2 and FIG. 3; generating aggregated event traces may include grouping claims by claim identifier and converting textual descriptions within individual event traces to graphical equivalents (i.e., atomic words). The preprocessor (e.g., preprocessor 162) may perform some compression and/or normalization.

The method 500 may include encoding each of the aggregated event traces, wherein each unique event in the aggregated event traces is represented using a respective atomic word (block 506). Of course, the respective atomic word need not be unique within or across event traces (e.g., the same unique event may occur more than once in a single event trace). The encoder 164 may be implemented using a database. For example, in an embodiment, the encoder 164 may query the atomics database 108-B with a first parameter (e.g., "filed a claim claim") and a second parameter specifying an atomic word type (e.g., Emoji, Unicode, hexadecimal, etc.). The database 108-B may return the corresponding atomic word, encoded in the appropriate atomic word type. The mapping of textual descriptions to atomic words in the atomics database 108-B may use normalized words as discussed above. In some embodiments, a fuzzy matching algorithm may be used with the machine learning module 168 to normalize textual descriptions. A ranking of probabilities may be used to list the most likely atomic words corresponding to a given textual description.

The method 500 may include generating a subset of aggregated event traces by compressing the aggregated event traces (block 508). A compression module (e.g., the compressor 166) may compress an aggregated event trace. "Compression" may refer to the act of applying a data compression algorithm (e.g., gzip) to data within the event trace. Text compression ratios are high, and such data compression may beneficially result in much smaller storage requirements. "Compression" also refers to the act of reducing the size of a data set (e.g., dimensionality reduction) without affecting the statistical properties of the data set. For example, the compressor may compute a distribution over the aggregated event trace and extract from the aggregated event trace a data set that is representative of the entire data set. Large reductions in set cardinality, and concomitant analysis speedups, have been shown in practice through the use of such methods.

The method 500 may include clustering each of the subset of aggregated event traces into a respective cluster (block 510). The subset may correspond to the compressed data set of the original uncompressed aggregated event traces. As depicted in FIG. 4, respective keys belonging to the clustered aggregated event traces (e.g., claim IDs) may be displayed along with the clusters to allow an analyst to quickly determine the cluster membership of an individual event trace. In some embodiments, a report, web page, or other graphical element may be generated that includes the clusters as shown in FIG. 4 or in another format. Such a graphical element may be transmitted to a user for display (e.g., via email, via a mobile computing device, etc.). In some embodiments, the clusters may be depicted differently, for example in a list format, a tabular format, etc. or in another format depicting the cluster membership of the aggregated event traces. In some embodiments, the graphical elements may be interactive, such that a user can click on one of the keys belonging to the event trace to view additional information regarding the clicked event trace.

The method 500 may include labeling each of the plurality of clusters by analyzing the subset of corresponding aggregated event traces (block 512). For example, the mapping module 170 may use a cluster labeling algorithm to determine whether events in the respective clusters are statistically independent. The statistical independence of events may be computed and a cluster label may be computed when independence is shown. In some embodiments, only some attributes of each aggregated event trace is analyzed during labeling. For example, the mapping module 170 may analyze metadata associated with claim records.

Additional Considerations

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

The patent claims at the end of this patent application are not intended to be construed under 35 U.S.C. § 112 (f) unless traditional means-plus-function language is expressly recited, such as "means for" or "step for" language being explicitly recited in the claim(s). The systems and methods described herein are directed to an improvement to computer functionality, and improve the functioning of conventional computers.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, the term "set" may include a collection of one or more elements.

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer implemented method for improving identifying of a process using compact visualizations with memorable characters, comprising:
    storing formatted data from a data collection device in an electronic database, wherein the formatted data corresponds to insurance claims data;
    generating aggregated event traces by preprocessing the formatted data;
    encoding each of the aggregated event traces, wherein each unique event in the aggregated event traces is represented using a respective graphical representation of an atomic word;
    generating a subset of aggregated event traces by compressing the aggregated event traces;
    clustering each of the subset of aggregated event traces into a respective cluster;
    labeling each of the clusters by analyzing the subset of corresponding aggregated event traces; and
    displaying a map of the one or more of the aggregated event traces in a linear order, wherein the aggregated event traces include one or more complex data types.

2. The method of claim 1, wherein storing the formatted data from the data collection device in the electronic database includes receiving data input in an application of an enterprise insurance claims system.

3. The method of claim 1, wherein generating the aggregated event traces by preprocessing the formatted data includes aggregating multiple insurance claim events by insurance claim identifier.

4. The method of claim 1, wherein each respective atomic word is 1) a Unicode character or 2) an Emoji.

5. The method of claim 1, further comprising normalizing each unique event in the aggregated event traces.

6. The method of claim 1, wherein clustering each of the subset of aggregated event traces into the respective cluster includes using a bag of words metric and an agglomerative clustering algorithm.

7. The method of claim 1, wherein labeling each of the clusters by analyzing the subset of the corresponding aggregated event traces includes using one or both of i) multidimensional scaling and ii) latent Dirichlet allocation.

8. A computing system for identifying processes, comprising:
    one or more processors, and
    a memory including computer executable instructions that, when executed by the one or more processors, cause the computing system to:
        store formatted data from a data collection device in an electronic database, wherein the formatted data corresponds to insurance claims data;
        generate aggregated event traces by preprocessing the formatted data;
        encode each of the aggregated event traces, wherein each unique event in the aggregated event traces is represented using a respective graphical representation of an atomic word;
        generate a subset of aggregated event traces by compressing the aggregated event traces;
        cluster each of the subset of aggregated event traces into a respective cluster;
        label each of the clusters by analyzing the subset of corresponding aggregated event traces; and
        display a map of the one or more of the aggregated event traces in a linear order, wherein the aggregated event traces include one or more complex data types.

9. The computing system of claim 8, the memory containing further instructions that, when executed by the one or more processors, cause the computing system to:
    receive data input in an application of an enterprise insurance claims system.

10. The computing system of claim 8, the memory containing further instructions that, when executed by the one or more processors, cause the computing system to:
    aggregate multiple claim events by insurance claim identifier.

11. The computing system of claim 8, wherein each respective atomic word is 1) a Unicode character or 2) an Emoji.

12. The computing system of claim 8, the memory containing further instructions that, when executed by the one or more processors, cause the computing system to:
    use a bag of words metric and an agglomerative clustering algorithm.

13. A non-transitory computer readable medium containing program instructions that when executed, cause a computer system to:
    store formatted data from a data collection device in an electronic database, wherein the formatted data corresponds to insurance claims data;
    generate aggregated event traces by preprocessing the formatted data;
    encode each of the aggregated event traces, wherein each unique event in the aggregated event traces is represented using a respective graphical representation of an atomic word;
    generate a subset of aggregated event traces by compressing the aggregated event traces;
    cluster each of the subset of aggregated event traces into a respective cluster;

label each of the clusters by analyzing the subset of corresponding aggregated event traces; and display a map of the one or more of the aggregated event traces in a linear order, wherein the aggregated event traces include one or more complex data types.

14. The non-transitory computer readable medium of claim 13, including further program instructions that when executed, cause a computer system to:

receive data input in an application of an enterprise insurance claims system.

15. The non-transitory computer readable medium of claim 13, including further program instructions that when executed, cause a computer system to:

aggregate multiple insurance claim events by insurance claim identifier.

16. The non-transitory computer readable medium of claim 13, including further program instructions that when executed, cause a computer system to:

normalize each unique event in the aggregated event traces.

17. The non-transitory computer readable medium of claim 13, including further program instructions that when executed, cause a computer system to:

use a bag of words metric and an agglomerative clustering algorithm.

18. The non-transitory computer readable medium of claim 13, including further program instructions that when executed, cause a computer system to:

use one or both of i) multidimensional scaling and ii) latent Dirichlet allocation for clustering.

\* \* \* \* \*